Patented Mar. 16, 1926.

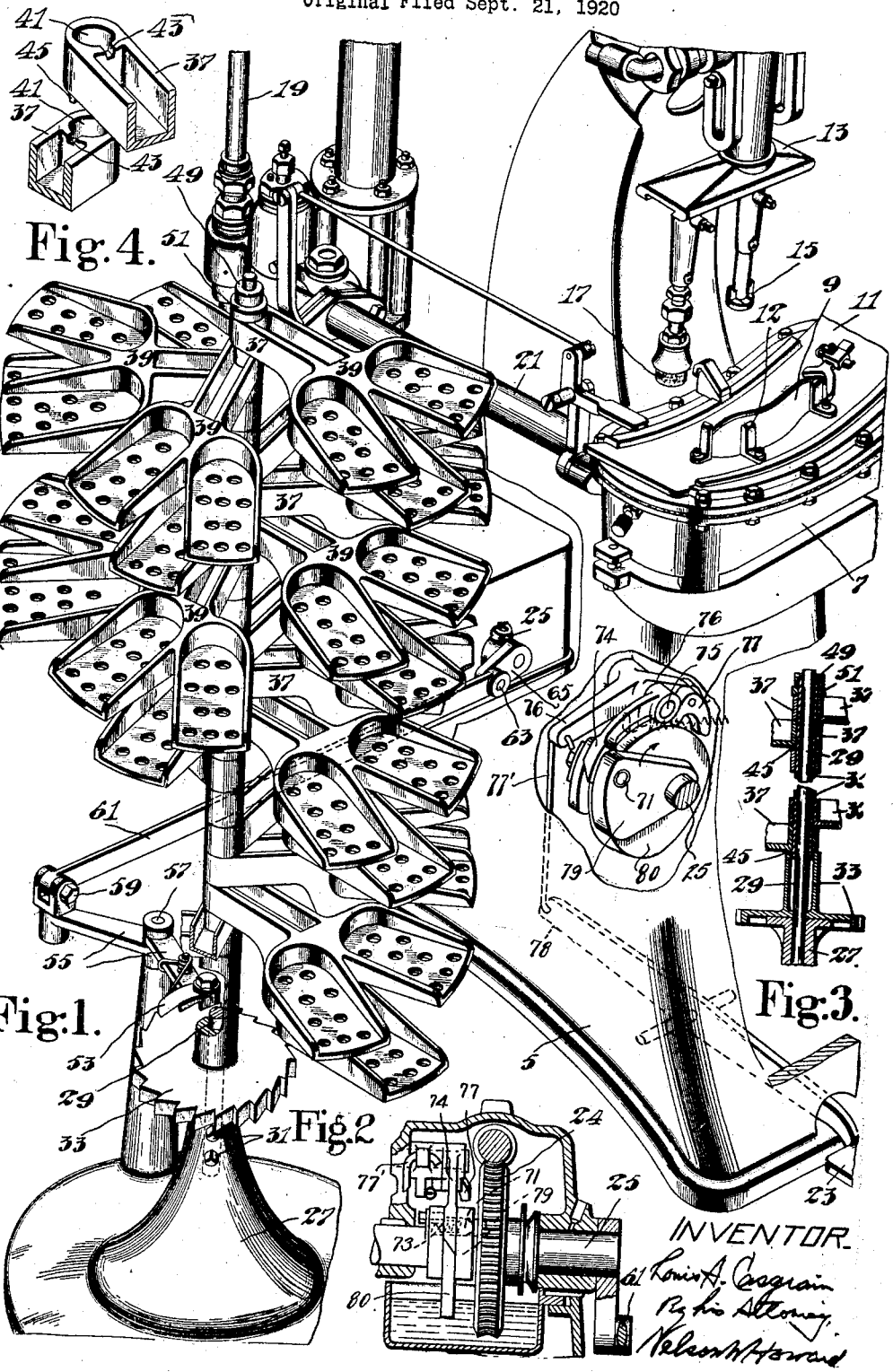

1,576,716

UNITED STATES PATENT OFFICE.

LOUIS A. CASGRAIN, OF BEVERLY, MASSACHUSETTS, ASSIGNOR TO UNITED SHOE MACHINERY CORPORATION, OF PATERSON, NEW JERSEY, A CORPORATION OF NEW JERSEY.

CONVEYING APPARATUS.

Application filed September 21, 1920, Serial No. 411,760. Renewed July 31, 1925.

*To all whom it may concern:*

Be it known that I, LOUIS A. CASGRAIN, a citizen of the United States, residing at Beverly, in the county of Essex and State of Massachusetts, have invented certain Improvements in Conveying Apparatus, of which the following description, in connection with the accompanying drawings, is a specification, like reference characters on the drawings indicating like parts in the several figures.

This invention relates to the presentation to the operator of a machine of pieces of work which are to be operated upon, and is herein illustrated as embodied in a sole-laying machine and a rotary rack for presenting to the operator lasted shoes, together with the soles which are to be laid upon them.

In the manufacture of a rubber-soled shoe the sole is usually laid by being placed accurately upon the bottom of the lasted shoe and pressed firmly into place, a machine for performing this operation being shown, for example, in application Serial No. 388,163, filed in my name which has resulted in Patent No. 1,495,163, granted May 27, 1924. Before the sole-laying takes place the bottom of the shoe is coated with cement, and the proper sole to fit the particular shoe is selected and in some way associated with the shoe, the two being kept together until the cement has dried enough to become tacky when they are ready for the sole-laying operation. The cementing operator and the sole-laying operator may thus work together, the former cementing the bottoms of the shoes and putting the shoes aside with their proper soles, and the latter, as soon as the cement has become tacky, laying the soles. Ordinarily an interval of about fifteen minutes is required for the cement to become tacky so that a considerable number of pieces of work, that is cemented shoes with their associated unlaid soles, accumulates between the cementing and the sole-laying operations. With the sole-laying machine of the application referred to above, an operator lays about twenty-five soles in fifteen minutes so that there is always an accumulation of about twenty-five pieces of work which should be taken care of in such manner that the sole-laying operator may readily select them one by one after each has stood for the required fifteen minutes or whatever the desired interval may be.

According to the present invention a support is provided for these and similar pieces of work which are to be operated upon by a machine, the support being actuated from a movable part of the machine so as to present the pieces successively in positions accessible to the operator. As herein illustrated the support takes the form of a rack comprising a series of carriers arranged in a spiral about a vertical axis and adapted to be rotated intermittently from the machine, one step for every operation of the machine. In use the rack is located between the cementing machine operator and the sole-laying machine operator, the former operator cementing the bottoms of the lasted shoes and placing the cemented shoes each with its associated sole upon the rack, and the latter operator taking them off and laying each sole on the proper shoe. With this construction the pieces of work which necessarily accumulate are taken care of in a small space, and each piece is in just the right condition as to the tackiness of the cement when it arrives in position to be taken from the rack by the sole-laying operator.

These and other features of the invention, including certain details of construction and combinations of parts will be described as embodied in an illustrative machine and pointed out in the appended claims.

Referring to the accompanying drawings,

Fig. 1 is a perspective of a rack for holding pieces of work and of a portion of a machine for operating upon the work;

Fig. 2 is a detail of the mechanism for driving the machine;

Fig. 3 is a detail in section showing the mounting of the carriers of the rack, and Fig. 4 is a detail in perspective showing the manner in which the stems of the carriers are interlocked.

Referring first to Fig. 1, a portion of a machine for laying rubber soles on lasted shoes such as rubber overshoes is shown, said machine comprising a frame 5 carrying a pressure box 7. Stretched across the top of the box is a flexible rubber diaphragm 9 and on top of the diaphragm is a sole-locating plate 11 having an opening to receive a sole, there being mounted on the plate adjacent to the opening lugs 12 for engaging the lasted shoe and facilitating its proper positioning on the sole. Above the plate and diaphragm is a last-support or jack 13 having a member 17 for engaging the toe portion of the lasted shoe and a member 15 for engaging the top of the heel end of the last. The jack is operated hydraulically by forcing water from a suitable reservoir (not shown) through a pipe 19; and the diaphragm 9 is pressed against the sole of the shoe by water forced into the pressure box 7 through a larger pipe 21. In the operation of the machine, a sole is laid upon the diaphragm 9 in the hole in the sole-locating plate 11 and a lasted shoe placed with its bottom on the sole. A treadle 23 is then depressed which throws in a clutch constructed and arranged to connect a continuously driven worm wheel 24 with a cam shaft 25 and impart one revolution to the shaft. The illustrative clutch, which may be of any approved type, comprises a pin 71 normally held to the left against the tension of a spring 73 and adapted when released to enter a socket in the left-hand face of the worm wheel 24. A wedge arm 74 holds the pin to the left in inoperative position as shown in Fig. 2. The hub of the wedge arm is loosely mounted on a small shaft 75 upon which is also loosely mounted the hub of a lever 76 to the forward end of which is pivoted the upper of the treadle rod 77', the lower end of said treadle rod being pivoted to the treadle 78. The rear portion of the lever 76 carries a pawl 77 which engages a projection on the hub of the wedge arm 74, said pawl having a tail which lies in the path of rotation of a segmental member 79 which is fast to the shaft 25. Fast also to this shaft is a disk 80 upon which the outer end of the wedge arm 74 normally rests. A spring 81 is connected at one end with a lug on the lever 76 and at the other end to the frame of the machine.

When the treadle 23 is depressed, the lever 76 is rocked about the shaft 75 to cause the pawl 77 to lift the wedge arm 74 and thereby release the pin 71 which is thereupon moved into a socket in the side of the worm wheel 24. As the shaft 25 revolves, the segmental member 79 presently strikes the tail of the pawl 77, thereby disengaging it from the projection on the hub of the wedge arm 74 and permitting said arm to fall until it rests upon the periphery of the disk 80. When the disk and the segmental member have made one revolution, the wedge arm engages the pin once more and withdraws it into inoperative position. The single revolution of the shaft 25, through mechanism not shown, causes the machine to operate as follows. The jack is swung forward until it is above the lasted shoe and is then brought down to force the shoe and diaphragm 9 down against a stop located in the pressure box 7. The diaphragm is then forced upwardly against the bottom and lower sides of the shoe to lay the sole firmly in place. After the sole has been thus laid, the pressure on the diaphragm is released, and the jack returned to its initial position as shown in Fig. 1. The operator then removes the shoe with its sole laid and proceeds to lay another sole on another lasted shoe. No further description of the construction and mode of operation of the sole-laying machine will be given since the invention is not limited to any particular type of machine and the details of the illustrative machine are shown and described in my prior patent which has been referred to above.

The illustrative machine has been used to lay rubber soles on heavy rubber overshoes. Before such soles are laid, the bottoms of the lasted overshoes are coated with cement which must stand for an interval to permit the cement to become tacky; and, in consequence of this and of the fact that each overshoe must have associated with it its particular sole, a considerable number of lasted overshoes each with its proper sole associated with it accumulates. The manner commonly used to associate an unlaid rubber sole with a lasted overshoe preparatory to the sole-laying operation is to lay the heel end of the sole on top of the last of the lasted shoe. An uncured rubber sole is tacky so that the heel end of the sole adheres to the top of the last, the remainder of the sole hanging down beside the rear end of the lasted overshoe. At the same time the adhesion of the heel end of the sole to the top of the last is light so that the sole may readily be detached by the sole-laying operator preparatory to the sole-laying operation.

In order to take care of these pieces of work (by which is meant the lasted overshoes with their bottoms cemented and their soles associated in some way with them) and to present them successively to the sole-laying operator, there is connected with the sole-laying machine a rack having a vertical spindle about which a series of carriers is spirally arranged. This rack comprises a short standard or base 27 having a vertical socket to receive the lower end of an upright rod or spindle 29, the rod being held in the socket by set screws 31. Mounted on the top of the standard is a ratchet 33 having integral with it an upstanding sleeve into the upper end of which is threaded the lower end of a pipe or sleeve 35 so that when the ratchet is rotated, the pipe will be rotated. Mounted in superposed relation about the pipe are the stems 37 of a plurality of carriers 39. Each stem 37 has a bore 41 to receive the pipe and is provided on its upper side with a notch 43 and on its under side with a lug 45 adapted to fit into the notch in the next lower stem. These notches and lugs are so positioned that when the carriers are assembled one above another on the pipe 35 they extend spirally around the vertical axis of the rod 29. The lug 45 of the lowermost stem 37 fits into a notch in the top of the upright sleeve which is part of the ratchet 33; and the stems are clamped one against another and against the top of this sleeve by a cap nut 49 and washer 51. It will now be evident that, when the ratchet 33 is rotated, the carriers will be rotated with it.

In order to rotate the ratchet intermittently, a spring-pressed pawl 53 is pivotally mounted on one end of a bent lever 55 which is fulcrumed near its middle about a stationary vertical axis 57, the other end of the lever being provided with a yoke to receive a bolt 59. Pivoted at one end to this bolt is a link 61, the other end of the link being pivoted at 63 to a crank arm 65 which is fast to the outer end of the one-revolution cam-shaft 25 of the sole-laying machine. Consequently, each time that the sole-laying operator depresses the treadle 23 of the sole-laying machine to lay a sole, the pawl 53 is operated to turn the ratchet 33 and with it the spirally arranged carriers 39.

It will be noted that each carrier 39, in the illustrated machine, comprises three shelves, two at the same level and extending obliquely to each other so as to leave a V-shaped opening between them and the third being located at a lower level and beneath the V-shaped opening. The purpose of this construction is to provide supports for more pieces of work than would be provided if each carrier comprised a single shelf, and more particularly to adapt the rack for use with arctics or similar overshoes. Three lasted arctics may be placed upon the three shelves of each carrier, and if the arctics are of the four-buckle type, which have comparatively tall leg portions, there will be room for the leg portion of any arctic which is placed upon the lower shelf of any carrier to extend up through the V-shaped opening between the two upper shelves of the same carrier.

In order to simplify the explanation of the operation of the apparatus, let it be assumed that each carrier is adapted to support but a single piece of work. In such case the cementing machine operator cements the bottom of a lasted overshoe, selects the proper rubber sole, lays the heel end of the sole on the top of the last and places the overshoe with its associated sole right side up upon the uppermost carrier. He then prepares another overshoe and sole and places them upon the next lower carrier, continuing in this manner until each carrier supports a cemented overshoe and an associated sole. Conveniently the rack may be rotated intermittently during this loading operation by grasping one of the carriers and pushing it the desired distance. At any rate the rack is preferably fully loaded before any of the soles are laid. By the time the rack is fully loaded, the cement which was put on the bottom of the first overshoe has become tacky enough for the sole laying operation or if it has not, a short wait may be made. The sole-laying machine operator then takes the piece of work (the overshoe and its associated sole) which is supported upon the uppermost carrier, places the sole in the opening in the sole-locating plate 11, places the lasted overshoe upon the sole and depresses the treadle 23. The depression of the treadle imparts one revolution to the cam-shaft 25 and causes the sole to be pressed against the bottom of the overshoe in the manner which has been outlined above and is described in detail in my prior application. At the same time, the link 61 is reciprocated by the crank 65, and through the bent lever 55 causes the pawl 53 to impart a partial rotation to the ratchet 33 and consequently to the spirally arranged carriers. The operator then removes from the machine the overshoe on which the sole has been laid, takes the next overshoe and its associated sole from the next carrier, and repeats the operation. As soon as one carrier has become empty, the cementing machine operator may fill it with a cemented overshoe and its associated sole, or several carriers may be allowed to become empty before the filling of them begins, since the cementing machine operator is able to work faster than the sole-laying machine operator and can readily keep the carriers filled with pieces of work. The illustrated rack, as has been described, has carriers each of which comprises three shelves. In this case the order in which overshoes are to be placed upon and removed is agreed upon, and the extent of the intermittent rotation of the ratchet 33 is such that each carrier from which overshoes are to be taken by the sole-laying machine operator is maintained within easy reach of that operator for a sufficient interval.

Although the illustrative embodiment of the invention comprises a sole laying machine and a rack adapted to support pieces of work suitable for operation upon by that machine, it should be understood that, in various aspects, the invention is not limited in the scope of its application to the particular machine or work support which has been shown and described.

Having thus described my invention, what I claim as new and desire to secure by Letters Patent of the United States is:

1. The combination with a machine having a member movement of which controls the operation of the machine, of a support for holding pieces of work which are to be presented manually by the operator to the machine, and means responsive to movement of the member for actuating the work support to bring the pieces of work successively into positions accessible to the operator.

2. The combination with a machine having a member movement of which controls the operation of the machine, of a support for holding pieces of work which are to be presented by the operator to the machine, and connections between the support and member such that movement of the member causes actuation of the work support to bring the pieces successively into positions accessible to the operator.

3. The combination with a machine for operating upon pieces of work, of a support for the pieces of work which are to be presented by the operator to the machine, means for actuating the work support to bring the pieces successively into positions accessible to the operator, and means for operating the work support actuating means from a movable part of the machine.

4. The combination with a machine having operator-controlled means for causing it to make one operation and come to rest, of a rack comprising carriers to support pieces of work which are to be presented by the operator to the machine, actuating means for imparting to the carriers movements to bring them successively into positions accessible to the operator, and means responsive to the manipulation of the operator-controlled means for operating the carrier-actuating means.

5. The combination with a machine having operator-controlled means for causing it to make one operation and come to rest, of a rack comprising carriers to support pieces of work which are to be presented by the operator to the machine, actuating means for imparting to the carriers intermittent movements to bring them successively into and cause them to come to rest in positions accessible to the operator, and means responsive to the manipulation of the operator-controlled means for operating the carrier-actuating means.

6. A rack for holding articles comprising a base, an actuating member rotatable on the base, a vertical spindle extending through the actuating member, a sleeve surrounding the spindle and rigid with the actuating member, a plurality of carriers the stems of which encircle the spindle, and interlock with one another, and means co-operating with the sleeve for clamping the carriers to the sleeve and actuating member.

7. The combination with a machine having an operator controlled member movement of which controls the operation of the machine, of a movable support for pieces of work, said support being adapted to have pieces of work placed upon it one ahead of another with respect to the direction of movement of the support, and means responsive to movement of the member by the operator for moving the work support to bring the pieces of work successively into positions accessible to the operator.

8. The combination with a machine having an operator controlled member manipulation of which causes the machine to go through one cycle of operation and come to rest, of a movable support for pieces of work which are to be presented manually by the operator to the machine, and means responsive to manipulation of the member for actuating the work support to bring the pieces of work successively into positions accessible to the operator.

In testimony whereof I have signed my name to this specification.

LOUIS A. CASGRAIN.